United States Patent
Nishio et al.

(10) Patent No.: US 6,755,486 B2
(45) Date of Patent: Jun. 29, 2004

(54) VEHICLE MOTION CONTROL SYSTEM

(75) Inventors: Akitaka Nishio, Okazaki (JP); Masanobu Fukami, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 234 days.

(21) Appl. No.: 09/967,040

(22) Filed: Oct. 1, 2001

(65) Prior Publication Data

US 2002/0043874 A1 Apr. 18, 2002

(30) Foreign Application Priority Data

Sep. 29, 2000 (JP) ........................................ 2000-298110

(51) Int. Cl.⁷ ............................................... B60T 8/44
(52) U.S. Cl. ............................... 303/114.3; 303/113.3; 303/114.1
(58) Field of Search ........................... 303/114.1, 114.2, 303/114.3, 113.3, 140–146

(56) References Cited

U.S. PATENT DOCUMENTS 5,938,297 A * 8/1999 Whaite et al. ........... 303/114.3
6,302,497 B1 * 10/2001 Takayama ................. 303/113.3
6,349,995 B1 * 2/2002 Itoh et al. ................. 303/113.3
6,364,429 B1 * 4/2002 Roden et al. ............. 303/114.3
6,382,737 B1 * 5/2002 Isono et al. ............... 303/114.1
6,422,660 B2 * 7/2002 Tozu et al. ................ 303/113.3

FOREIGN PATENT DOCUMENTS

JP                 5-213172 A      8/1993

* cited by examiner

Primary Examiner—Matthew C. Graham
(74) Attorney, Agent, or Firm—Burns, Doane, Swecker & Mathis, LLP

(57) ABSTRACT

The vehicle motion control system includes an automatic hydraulic pressure generator generating a hydraulic pressure irrespective of a brake pedal operation and a hydraulic pressure control valve adjusting the hydraulic brake pressure by opening or blocking a connection between the automatic hydraulic pressure generator and a wheel brake cylinder. The system includes vacuum pressure detecting means to adjust the hydraulic brake pressure in a appropriate condition. In response to the vacuum pressure detecting means, vehicle motion is controlled in the direction that the vehicle motion control is restricted under the vacuum pressure which drives said vacuum booster is relatively small. Also, the duration of the hydraulic brake pressure increase is controlled in the direction longer under the vacuum pressure which drives said vacuum booster is relatively small.

20 Claims, 10 Drawing Sheets

VEHICLE MOTION CONTROL SYSTEM

This application is based on and claims priority under 35 U.S.C. §119 with respect to Japanese Application No. 2000-298110 filed on Sep. 29, 2000, the entire content of which is incorporated herein by reference.

FIELD OF THE INVENTION

This invention generally relates to a vehicle motion control system. More particularly, the present invention pertains to a vehicle motion control system which supplies hydraulic pressure generated by an automatic hydraulic pressure generator, including irrespective of a brake pedal operation, to a wheel brake cylinder via a control valve. This vehicle motion control system is applicable to a brake steering controller and to a traction controller.

BACKGROUND OF THE INVENTION

A known type of vehicle motion control system is described in Japanese Patent Laid-Open Publication No. 5-213172 published in 1993. This vehicle motion control system uses a vacuum booster to obtain sufficient braking force for vehicle motion control. In this vehicle motion control system, when the system is unable to generate a sufficient braking force during slip control, the system prohibits the starting of braking operation. More specifically, it is judged whether or not a vacuum pressure in the constant pressure chamber of the vacuum booster is sufficient under non-braking condition from a vacuum condition detecting source. If the vacuum pressure in the constant pressure chamber does not have the required vacuum pressure, the brake control is prohibited. The system uses engine intake as a vacuum source and vacuum pressure is computed by using a throttle opening and a engine rotation sensor.

The known system described above suffers from several drawbacks. According to the known slip control system, when sufficient vacuum pressure is not maintained in the constant pressure chamber, braking control is prohibited by a control starting restriction means. According to this control, the system is not capable of enabling precise braking control to perform appropriate vehicle motion control. To perform precise vehicle motion control, it is necessary to adjust the starting point of the vacuum booster or control the variance of the braking force during the vacuum booster operation.

A need thus exists for a vehicle motion control system that adjusts the starting point of the vacuum booster operation to perform a more precise vehicle motion control even if the constant pressure chamber of the vacuum booster does not have sufficient vacuum pressure.

A need also exists for a vehicle motion control system that is able to adjust or vary the braking force in accordance with a decline in the vacuum pressure in the constant pressure chamber to control the vehicle motion even if the constant pressure chamber of the vacuum booster does not have sufficient vacuum pressure.

SUMMARY OF THE INVENTION

According to one aspect of the invention, a vehicle motion control system includes a wheel brake cylinder for applying a braking force to a wheel, an automatic hydraulic pressure generator which generates a hydraulic braking pressure by driving a vacuum booster irrespective of brake pedal operation, a hydraulic pressure control valve disposed between the automatic hydraulic pressure generator and the wheel brake cylinder to adjust hydraulic brake pressure supplied to the wheel brake cylinder, a brake controller for performing vehicle motion control by controlling the automatic hydraulic pressure generator and the hydraulic pressure control valve in accordance with a vehicle motion condition irrespective of brake pedal operation, and a vacuum pressure detecting means for detecting a vacuum pressure of the vacuum booster. The brake controller controls the starting of vehicle motion control in the direction that the vehicle motion control is restricted when the vacuum pressure which drives the vacuum booster is relatively small.

According to another aspect of the invention, a vehicle motion control system includes a wheel brake cylinder for applying a braking force to a wheel, an automatic hydraulic pressure generator which generates a hydraulic braking pressure by driving a vacuum booster irrespective of brake pedal operation, a hydraulic pressure control valve disposed between the automatic hydraulic pressure generator and the wheel brake cylinder to adjust hydraulic brake pressure supplied to the wheel brake cylinder, a brake controller for performing vehicle motion control by controlling the automatic hydraulic pressure generator and the hydraulic pressure control valve in accordance with a vehicle motion condition irrespective of brake pedal operation, and a vacuum pressure detector for detecting a vacuum pressure of the vacuum booster. The brake controller controls the duration of the hydraulic brake pressure increase in the wheel cylinder by the hydraulic pressure control valve in the direction to be longer when the vacuum pressure which drives said vacuum booster is relatively small.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
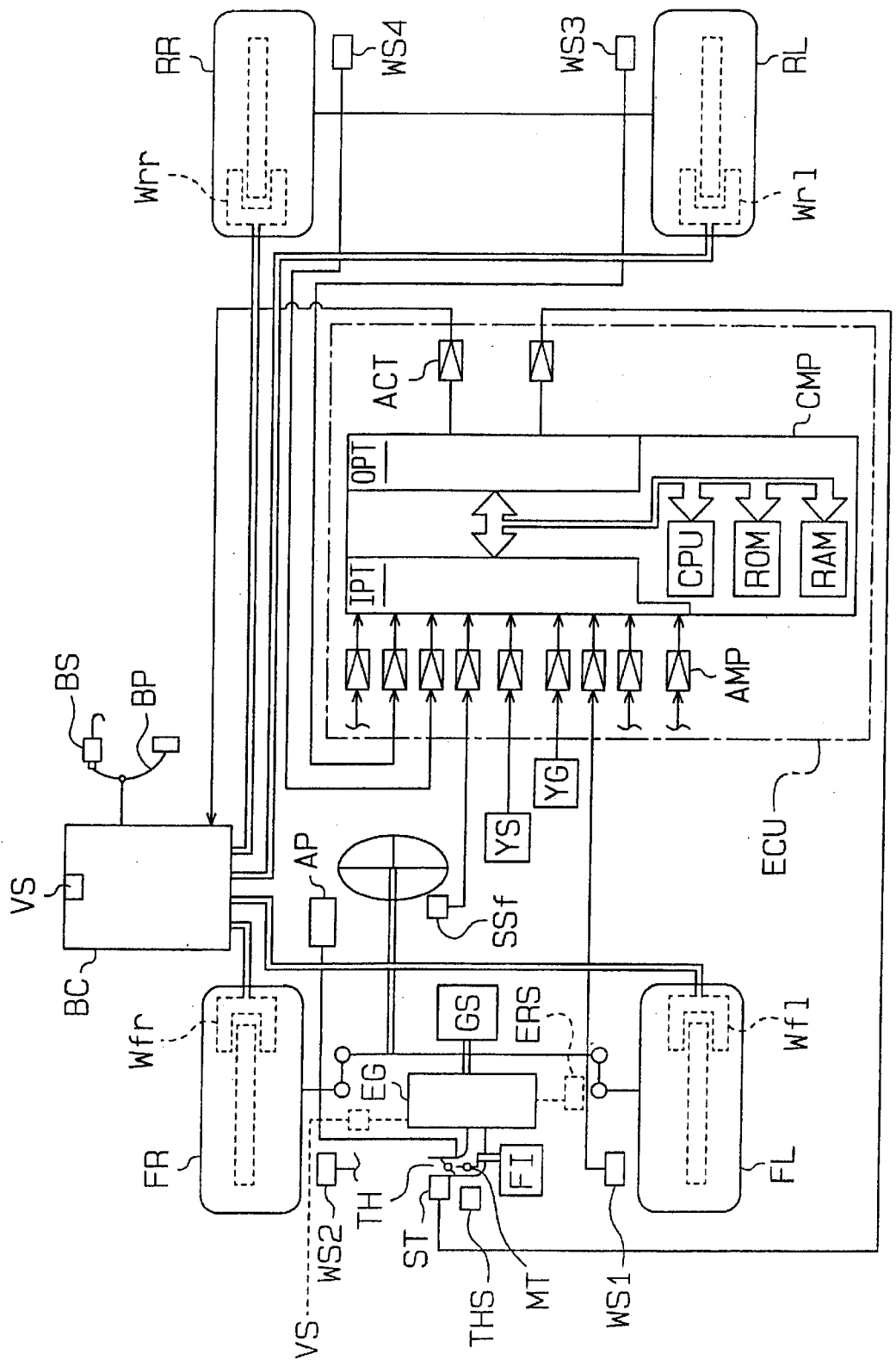
FIG. 1 is a schematic view of the vehicle motion control system according to an embodiment of the present invention.

An embodiment of a vehicle motion control system according to the present invention is described and explained below with reference to FIGS. 1 to 12. Referring initially to FIG. 1, in the vehicle braking control system, an internal combustion engine EG is provided with a throttle control device TH and a fuel injection device FI. The throttle control device TH controls the main throttle opening of a main throttle valve MT in accordance with the operation of an acceleration pedal AP. In accordance with the output of an electronic controller ECU, a sub-throttle valve ST of the throttle control device TH is operated to control a sub-throttle opening and the fuel injection device FI is operated to control the amount of fuel injection. The internal combustion engine EG is connected to a pair of front wheels FL, FR through a transmission GS. The illustrated vehicle is a front wheel drive type vehicle.

The braking system includes wheel brake cylinders Wfl, Wfr, Wrl, Wrr mounted on respective wheels FL, FR, RL, RR. A hydraulic brake pressure control device BC is connected with these wheel brake cylinders Wfl, Wfr, Wrl, Wrr. The wheel FL represents the front left driving wheel, the wheel FR represents the front right driving wheel, the wheel RL represents the rear left driven wheel, and the wheel RR represents the rear right driven wheel. The hydraulic brake pressure control device BC described below is constructed in the manner shown in FIG. 2.

As further shown in FIG. 1, a plurality of wheel speed sensors WS1, WS2, WS3, WS4 are provided, with each of the wheel speed sensors being operatively associated with a respective one of the wheels FL, FR, RL, RR. These wheel speed sensors WS1, WS2, WS3, WS4 are connected to the electronic controller ECU so that the rotational speed of each wheel, which is indicated as a pulse whose number is proportional to the respective wheel speed, is inputted to the electronic controller ECU.

A plurality of additional elements are also connected to the electronic controller ECU. These elements include a vacuum pressure sensor VS detecting the actual vacuum pressure Vr in a vacuum booster, the details of which will be described below, a brake switch BS which is turned on when a brake pedal BP is depressed, a front wheel steering angle sensor SSf which detects the steering angle δf of the front wheels FL, FR, a lateral acceleration sensor YG which detects the actual lateral acceleration Gya of the vehicle, a yaw rate sensor YS which detects the yaw rate γ of the vehicle, and a throttle sensor THS which detects the openings of the main throttle valve MT and the sub-throttle valve ST. The yaw rate sensor YS detects the rate of change of the vehicle rotation angle (yaw angle) at a vertical axis located at the center of gravity of the vehicle. This is referred to as the yaw rate. The yaw rate is outputted to the electronic controller ECU as an actual yaw rate γa.

The electronic controller ECU is provided with a microcomputer CMP which includes a central processing unit CPU, a read only memory ROM, a random access memory RAM, an input port IPT, and an output port OPT which are reciprocally connected through a bus. Output signals from, for example, the wheel speed sensors WS1, WS2, WS3, WS4, the brake switch BS, the front wheel steering angle sensor SSf, the yaw rate sensor YS, the lateral acceleration sensor YG and the throttle sensor SS, are inputted via an amplifier circuit AMP and a respective input port IPT into the central processing unit CPU. The control signal is outputted from the output port OPT to the throttle control device TH and the hydraulic brake pressure control device BC respectively via driving circuits ACT.

The read only memory ROM memorizes a program dealing with various processes including the steps shown in the flowcharts of FIGS. 3–6. The central processing unit CPU runs the programs while an ignition switch is turned it on. The random access memory RAM tentatively memorizes variable data necessary for running the program. It should be noted that a plurality of microcomputers may be used for each control device such as the throttle control, or may be used for several control devices which relate to one another.

Figure 2:
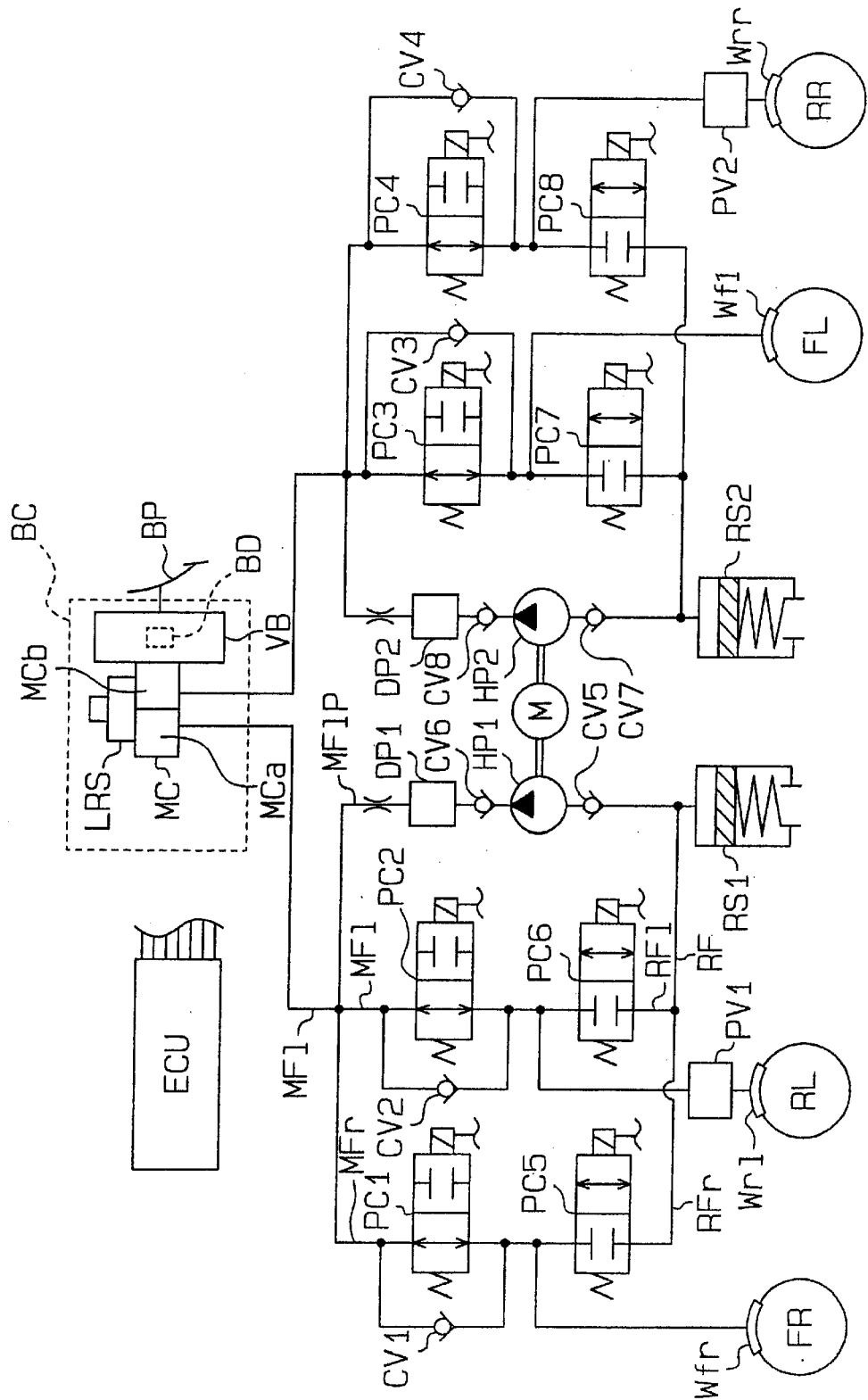
FIG. 2 is a schematic illustration of the hydraulic pressure system forming a part of the motion control system shown in FIG. 1.

FIG. 2 shows the brake hydraulic control system which includes the hydraulic brake pressure control device BC. A master cylinder MC is boosted via a vacuum booster VB in accordance with the operation of the brake pedal BP. The brake fluid in a master reservoir LRS is pressurized to output master cylinder hydraulic pressure to the brake hydraulic control system of the wheels FR, RL and another brake hydraulic control system of the wheels FL, RR, respectively. Thus, the illustrated braking system shown in FIG. 2 is a diagonal braking system.

The master cylinder MC, which may be a tandem style master cylinder, includes two pressure chambers MCa, MCb, each connected to one of the two brake hydraulic control systems. The first pressure chamber MCa communicates with the brake hydraulic control system for the wheels FR, RL on the one side and the second pressure chamber MCb is connected to the brake hydraulic control system for the wheels FL, RR on the other side. The vacuum booster VB is described hereafter in accordance with the FIG. 3.

With respect to the brake hydraulic control system associated with the FR, RL wheel side, the first pressure chamber MCa is connected to the wheel brake cylinders Wfr, Wrl respectively via a main hydraulic pressure conduit MF1 and respective branch hydraulic pressure conduits MFr, MFl. The branch hydraulic pressure conduits or circuits MFr, MFl include normally open two-port, two-position solenoid switching valves PC1, PC2 (switching valves), respectively. In addition, a check valve CV1, CV2 (one-way valve) is disposed parallel to each of the switching valves PC1, PC2. The check valves CV1, CV2 only allow brake fluid flow in the direction of the master cylinder. The brake fluid in the wheel brake cylinder Wfr, Wrl is returned to the master cylinder MC and the master cylinder reservoir LRS via these check valves CV1, CV2 and the switching valves PC1, PC2. Accordingly, the hydraulic pressure in the wheel brake cylinders Wfr, Wrl promptly follows the decrease of the hydraulic pressure of the master cylinder MC when the brake pedal BP is released. Normally closed two-port, two-position solenoid switching valves PC5, PC6 (switching valves) are disposed on the respective branch hydraulic pressure conduits RFr, RFl on the discharge circuit connected to the wheel brake cylinders Wfr, Wrl. The discharge hydraulic pressure conduit RF connected to the branch hydraulic pressure conduits RFr and RFl is connected to an auxiliary reservoir RS1.

The auxiliary reservoir RS1 is connected to the suction side of a hydraulic pressure pump HP1 via a check valve CV5 and the emission or discharge side of the hydraulic pressure pump HP1 is connected at a point upstream of the switching valves PC1, PC2 via the check valve CV6 through a hydraulic pressure conduit MF1p. The hydraulic pressure pump HP1 is driven by an electric motor M, and the hydraulic pressure pump HP1 pumps brake fluid from the auxiliary reservoir RS1 to return it to the emission side. The auxiliary reservoir RS1 is disposed independently from the master reservoir LRS of the master cylinder MC. The auxiliary reservoir RS1 is provided with a piston and a spring, and is adapted to reserve a predetermined amount of brake fluid. The auxiliary reservoir can be referred to as an accumulator. The check valves CV5, CV6 function as a suction valve and an emission valve respectively and regulate the flow of brake fluid emitted through the hydraulic pressure pump HP1 in one direction. The check valves CV5, CV6 are preferably structured in one piece with the hydraulic pressure pump HP1.

A damper DP1 located between the check valve CV6 and the hydraulic pressure conduit MF1p is disposed on the emission or discharge side of the hydraulic pressure pump HP1. In addition, a proportioning valve PV1 is disposed in the fluid pressure conduit that is connected to the wheel brake cylinder Wrl on the rear wheel side.

The hydraulic brake pressure system associated with the FL, RR wheel side is similar to the hydraulic brake pressure system associated with the FR, RL wheel side described above, and includes normally open type solenoid switching valves PC3, PC4, normally closed type solenoid switching valves PC7, PC8, check valves CV3, CV4, CV7, CV8, an auxiliary reservoir RS2, a damper DP2, and a proportioning valve PV2 disposed in the manner shown in FIG. 2 and in a manner similar to that described above with respect to the hydraulic brake pressure system on the FR, RL wheel side. A hydraulic pressure pump HP2 is driven by the same electric motor M that drives the hydraulic pressure pump HP1.

The switching valves PC1–PC8 constitute the parts of the hydraulic pressure control valve that adjust the hydraulic brake pressure of the wheel brake cylinders of each wheel in response to the output signal from the electronic controller ECU so that various brake steering controls can be performed.

Figure 3:
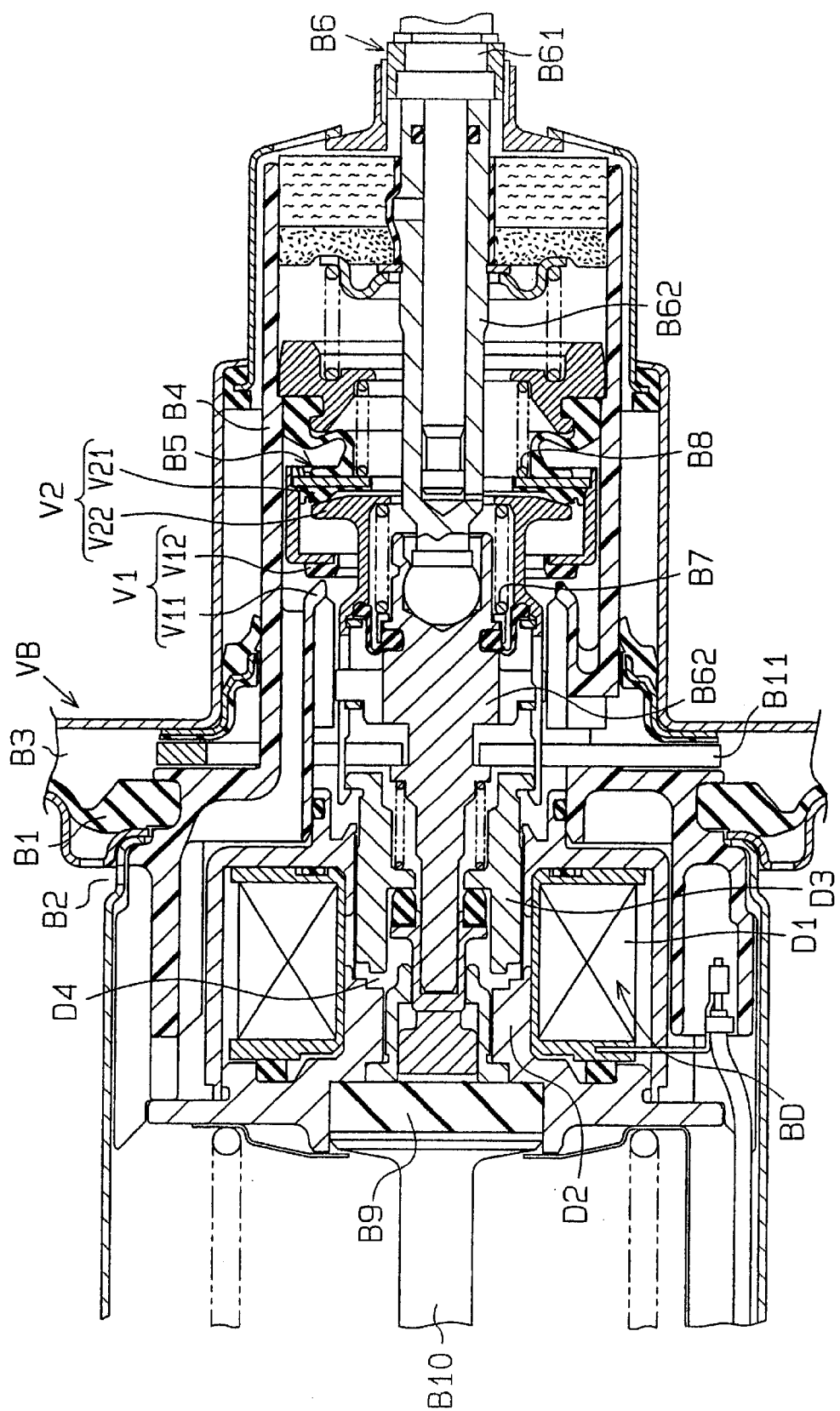
FIG. 3 is a cross-sectional view of the vacuum booster used in the hydraulic pressure system shown in FIG. 2.

The vacuum booster VB utilized in connection with the present invention is shown in FIG. 3. A booster driving device BD (solenoid coil) is disposed in the vacuum booster VB to operate the vacuum booster without operation of the brake pedal BP. The basic structure of the vacuum booster VB is the same as the structure of known vacuum boosters and includes a constant pressure chamber B2 and a variable pressure chamber B3 separately formed within the interior of a housing by a movable partition B1. The movable partition B1 is connected to a power piston B4 so that the two move together. A valve mechanism B5 is provided and includes a vacuum valve V1 interrupting communication between the constant pressure chamber B2 and the variable pressure chamber B3 and an air valve V2 interrupting communication between the variable pressure chamber B3 and the atmosphere. The constant pressure chamber B2 is in constant communication with a negative pressure source (e.g., an intake manifold of the engine EG), and the negative pressure is introduced into the constant pressure chamber. The vacuum pressure sensor VS, which is illustrated in FIG. 1, is disposed in the constant vacuum chamber B2 for detecting the actual vacuum pressure Vr in the constant pressure chamber B2. The power piston B4 is connected to an output rod B10 through the fixed core D2 and a reaction disc B9, with the output rod B10 being operatively connected the master cylinder MC.

The vacuum valve V1 includes a valve V11 formed on the power piston B4 and a valve seat V12. The air valve V2 includes an elastic valve seat V21 attached on the valve seat V12 and a valve V22. The valve V22 is linked to an input rod B6 which is connected with the brake pedal BP, and is urged toward the elastic valve V22 by a compressed spring B7. On the other hand, the valve seat V12 is urged toward the valve V11 by a compressed spring B8. The compressed spring B8 also urges the elastic valve seat V21 toward the valve V22 together with the spring B7.

The vacuum valve V1 and the air valve V2 of the valve mechanism B5 open and close in accordance with the operation of the brake pedal BP. The differential pressure derived from the operation of the brake pedal BP is generated between the constant pressure chamber B2 and the variable pressure chamber B3. As a result, the output boosted power in accordance with the operation of the brake pedal BP is transmitted to the master cylinder MC. The variable pressure chamber B3 can be selectively under one of two operating conditions. In one operating condition, the variable pressure chamber B3 is under a negative pressure by virtue of being in communication with the constant pressure chamber B2. In the other operating condition, the variable pressure chamber B3 is disconnected from the constant pressure chamber B2 and is exposed to the atmosphere through operation of the valve mechanism B5.

The booster driving device BD includes a solenoid D1, a movable core D3 and the fixed core D2. When the booster driving device BD is energized, the solenoid D1, which is connected to the electronic controller ECU, pulls the movable core D3 in the direction of the fixed core D2. The fixed core D2 is arranged between the power piston B4 and a reaction disc B9, and permits the power flow from the power piston B4 to the reaction disc B9. The movable core D3 is arranged rearwardly of the fixed core D2 in the inner hollow portion of the solenoid D1, and a magnetic gap D4 is defined between the fixed core D2 and the movable core D3 to permit sliding movement of the movable core D3. The movable core D3 is operatively connected to the valve V22 of the air valve V2 so that if the movable core D3 is pulled through energization of the solenoid D1, where the amount of the magnetic gap D4 is decreased, the valve V22 moves in the direction of the fixed core D2 (i.e., toward the left in FIG. 3).

The input rod B6 is comprised of a first input rod B61 and a second input rod B62. The first input rod B61 is operatively connected to the brake pedal BP and the second input rod B62, which is movable relative to the first input rod B61, is connected to the output rod B10 through the power piston B4 and a key member B11. Therefore, when the second input rod B62 moves in response to the operation of the booster driving device BD, the first input rod B61 remains in the same position. This independent operation constitutes a brake pedal leaving mechanism.

Therefore, an automatic brake hydraulic generation system is constituted by using the vacuum booster VB (including the booster driving device BD) and the master cylinder MC. The operation of the system in the absence of a depression force applied to the brake pedal BP (e.g. a brake steering control, a traction control) is as follows.

When the electronic controller ECU initiates the automatic brake operation, the solenoid D1 is energized and then the valve V22 moves together with the movement of the movable core D3 against the urging force of the spring B7. As a result, communication between the valve seat V12 and the valve V11 is closed by the urging force of the spring B8.

After this condition, communication between the elastic valve seat V21 and the valve V22 is established, and the atmospheric air is introduced into the variable pressure chamber B3. Accordingly, a pressure difference is established between the constant pressure chamber B2 and the variable pressure chamber B3. The power piston B4, the fixed core D2, the reaction disc B9 and the output rod B10 thus move together in the direction of the master cylinder MC. As a consequence, the master cylinder is operated irrespective of the operation of the brake pedal BP (that is, even when the brake pedal is not depressed). After the power piston B4 is engaged with the key member B11, the second input rod B62 moves together with the power piston B4. Under this condition, the movement of the power piston B4 is not transmitted to the first input rod B61 and the first input rod B61 is maintained at the initial position. Namely, the brake pedal BP is maintained at the initial position under the vacuum booster VB being automatically operated.

The aforementioned switch valves PC1–PC8, the electric motor M and the booster driving device BD are controlled by the electronic controller ECU as shown in FIG. 1. Various vehicle motion controls such as a brake steering control (oversteering control and/or understeering control) or traction control are performed by the parts mentioned above. When the ignition switch is turned on, a motion control program according to the flowchart shown in FIG. 4 is processed at a 6 ms calculation cycle.

Figure 4:
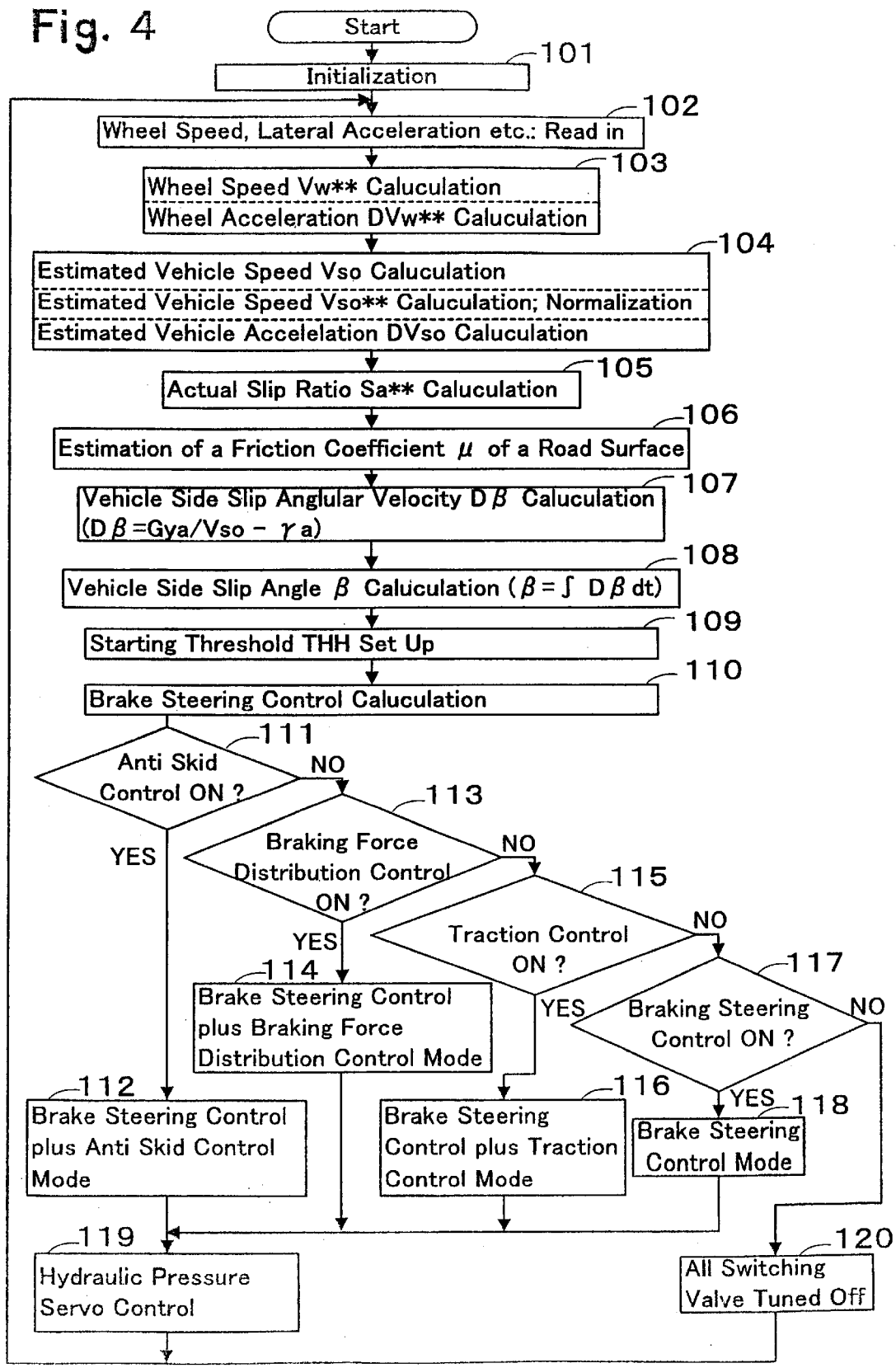
FIG. 4 is a flow chart explaining the process and operation of the motion control system according to the present invention.

According to the flowchart in FIG. 4, the microcomputer CMP is first initialized in step 101. Then, in step 102 the microcomputer CMP reads in, for example, the wheel speeds from the wheel speed sensors WS1–WS4, the signal from the steering angle sensor SSf (i.e., the steering angle $\delta f$), the signal from the yaw rate sensor YS (i.e., the actual yaw rate $\gamma a$), the signal from the lateral acceleration sensor YG (i.e., the actual lateral acceleration indicated as Gya), the signal from the throttle sensor THS, and the signal from the vacuum sensor VS.

In step 103, the wheel speed Vw (indicates each wheel, with FW standing for the front wheels and RW standing for the rear wheels) of each wheel is calculated, the wheel acceleration DVw of each wheel is calculated by applying differential calculus to the calculated wheel speed Vw. Next, in step 104, the estimated vehicle speed (at the center of gravity position vehicle speed) Vso, which is derived from the maximum wheel speed Vw of each wheel, is calculated (Vso=MAX(Vw)). Next, the estimated vehicle speed (vehicle speed at each wheel position) Vso at the position of each wheel is calculated using the wheel speed Vw. If necessary, normalization to the estimated vehicle speed at each wheel position is conducted to reduce the error derived from the difference between the minimum turning outer radius and the minimum turning inner radius when the vehicle is turning. A normalized vehicle speed Nvso is calculated as Nvso=Vso(n)−$\Delta$Vr(n). $\Delta$Vr**(n) indicates a correction coefficient for correcting the turning. By way of example, the correction coefficient mentioned above is set as follows.

The correction coefficient $\Delta$Vr** is set following a map (not shown) of each wheel, except the standardized wheel is based on the turning radius R of the vehicle and $\gamma$ VsoFW (=lateral acceleration Gya). When $\Delta$VrFL is set as a standardized wheel, $\Delta$VrFL is equivalent to 0, $\Delta$VrFR is set following the difference between the turning outer radius and the turning inner radius gap map, $\Delta$VrRL is set following the difference between the minimum turning inner radius and the minimum turning inner radius gap map, $\Delta$VrRR is set following a difference between the minimum turning outer radius and the minimum turning outer radius gap map and a difference between the minimum turning outer radius and the minimum turning inner radius gap map. An estimated vehicle acceleration (vehicle acceleration at the center of gravity position) DVso in the longitudinal direction at the center of gravity position of the vehicle, having a different sign (e.g., minus sign), is calculated by differentiating or applying differential calculus to the vehicle speed Vso at the center of gravity position.

The program then proceeds to step 105 where the actual slip ratio Sa of each wheel is calculated using the wheel speed Vw of each wheel and the vehicle speed Vso at each wheel position obtained from steps 103 and 104. The actual slip rate is calculated applying the equation Sa= (Vso−Vw)/Vso. The operation then proceeds to step 106, at which the friction coefficient $\mu$ of the road surface is estimated or approximated as Sa=$(Dvso^2+Gya^2)^{1/2}$ based on the estimated vehicle acceleration DVso at the center of gravity position and the actual acceleration Gya from the detected signal of the lateral acceleration sensor YG. A friction detection sensor and/or other detection means can also be utilized to detect the friction coefficient $\mu$ of the road surface.

Next, in step 107 a side slip angular velocity D$\beta$ is calculated as D$\beta$=(Gya/Vso−$\gamma$a) based on the detected signal from the yaw rate sensor YS (the actual yaw rate $\gamma$a), the detected signal from the lateral acceleration sensor YG (the actual lateral acceleration Gya), and the vehicle speed Vso at the center of gravity position. Then, in step 108, a vehicle side slip angle $\beta$ is calculated as $\beta$=$\int$(Gya/Vso−$\gamma$a)dt. The vehicle side slip angle $\beta$ is the angle of the vehicle direction to the forward direction of the vehicle. The angular velocity of the vehicle skidding D$\beta$ is calculated as d$\beta$/dt which is the differential derivation value of the vehicle side slip angle $\beta$.

In step 109, a starting threshold THH, which will be described later, is set up. Then, in step 110, a brake steering control process is performed and a target slip ratio for controlling is set up. Finally, in step 119, a hydraulic pressure servo control is performed, with the hydraulic brake pressure control device BC being controlled in accordance with the vehicle motion. This hydraulic pressure servo control is used to carry out various control modes which will be described later. The program then returns to step 102.

In step 111, if it is judged that the anti-skid control should be applied, the program proceeds to step 112 and the operating mode is placed into the brake steering control plus the anti-skid control mode. Consequently, the program proceeds to step 119 and the hydraulic pressure servo control is performed. If it is determined that the anti-skid control should not be applied in step 111, the program proceeds to step 113 and it is judged that whether or not the braking force distribution control, which operates the braking force distribution between the front and the rear wheels, should be applied. If the braking force distribution control should be applied, the program proceeds to step 114 and the operating mode is placed in the brake steering control plus the braking force distribution control mode. Consequently, the program proceeds to step 119 and the hydraulic pressure servo control is performed. If it is determined in step 113 that the braking force distribution control should not be applied, the program proceeds to step 115 and it is judged whether or not the traction control should be applied. If the traction control should be applied, the program proceed to step 116 and the operating mode is placed in the brake steering control plus the traction control mode. Consequently, the program proceeds to step 119 and the hydraulic pressure servo control is performed. If it is determined that the traction control should not be applied in step 115, the program proceeds to step 117 where it is judged whether or not the brake steering control should be applied. If the brake steering control should be applied, the program proceeds to the step 118 and the operating mode is placed in the brake steering control mode. The program then proceeds to step 119 and the hydraulic pressure servo control is performed. If it is determined that the brake steering control should not be applied in step 117, the program proceeds to step 120 and all the switching valves PC1–PC8 are placed in the turn off condition. After carrying out step 119 or step 120, the program returns to step 102. Based on the operations performed in steps 112, 114 116 and 118, if necessary, the opening value of the sub-throttle valve ST of the throttle control device TH is adjusted and then the output driving power of the engine EG is decreased.

Figure 7:
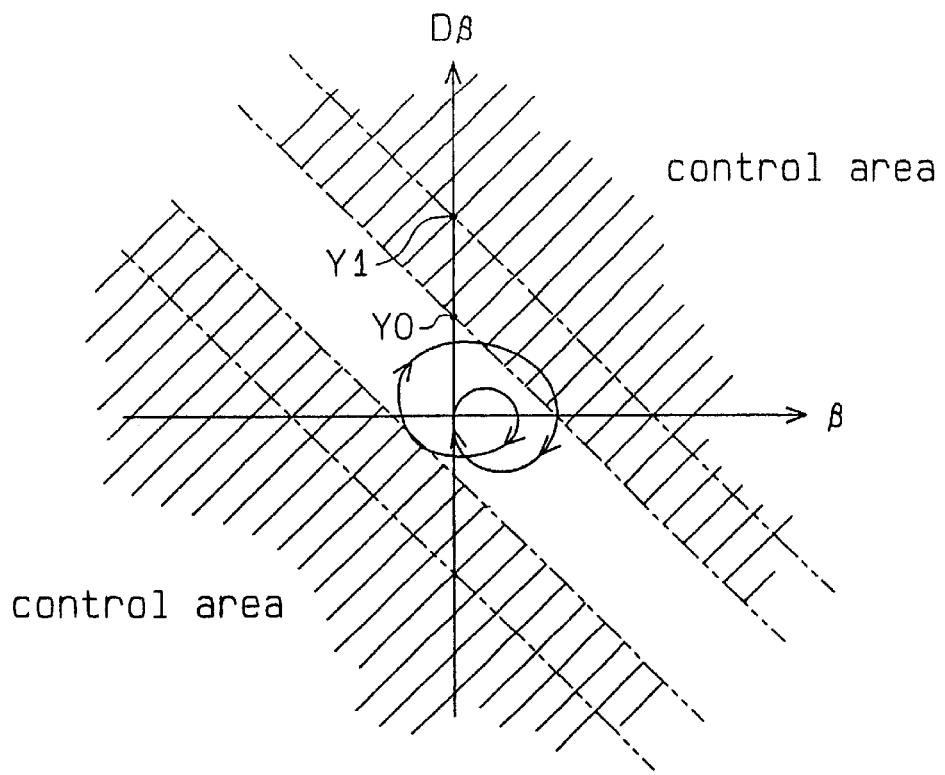
FIG. 7 is a graph showing a controlled area of oversteering control according to the present invention.

The brake steering control calculation in step 110 of FIG. 4 is explained with reference to the subroutine shown in FIG. 5. The brake steering control calculation includes oversteering control (OS) and understeering control (US). With respect to the controlled wheels, a target slip ratio in accordance with the oversteering control or understeering control is set up. Initially, in steps 201 and 202, a start or termination of the oversteering control or understeering control is judged. A start and termination judgment of the oversteering control in step 201 is performed based on whether the condition of the steering control is in a controlled area indicated with cross hatching in FIG. 7. When the value of the vehicle side slip angle β and the side slip angular velocity Dβ is in the controlled area, the oversteering control starts and when the steering control is out of the controlled area, the oversteering control is terminated. The oversteering is controlled as shown in FIG. 7 as a curve with an arrow. The braking force of each wheel is maximized at the point where the curve has the farthest distance from the borders between the controlled areas and the non controlled area which are identified with the two dotted chain lines in FIG. 7.

The two dotted chain lines shown in FIG. 7 represent the threshold of whether or not the oversteering control is applied. The two dotted chain lines cross the axis of the side slip angular velocity Dβ at an intercept Y0. However, the one dotted chain lines which are located in the cross-hatched area in FIG. 7, cross the side slip angular velocity Dβ, for instance, at an intercept Y1. The intercept, which is represented by the dotted chain line and the axis of the side slip angular velocity Dβ, is determined based on the map shown in FIG. 10.

Figure 10:
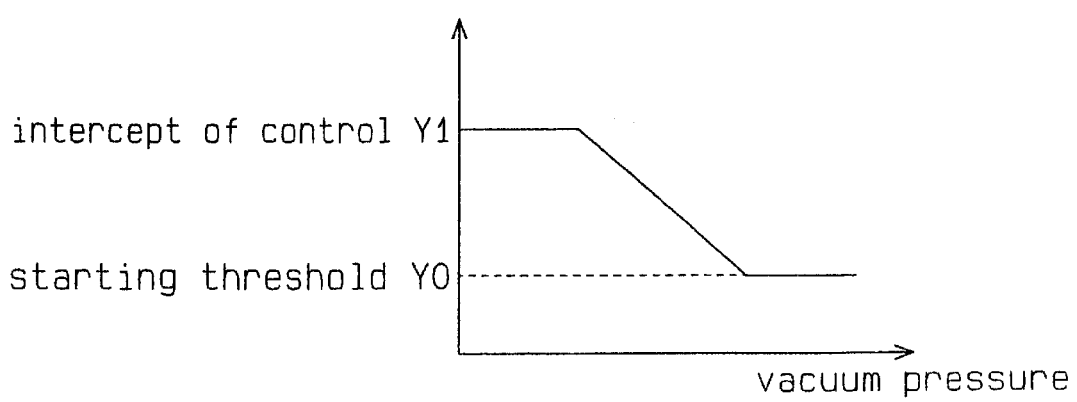
FIG. 10 is a graph showing the relationship between the vacuum pressure and the side slip angular velocity.

In FIG. 10, the lateral axis represents the value of the actual vacuum pressure Vr in the constant pressure chamber B2 of the vacuum booster VB and the vertical axis represents the value of the intercept on the axis of the side slip angular velocity Dβ. The more the actual vacuum pressure Vr decreases, the more the intercept increases. Thus, when the actual vacuum pressure Vr is decreased, it is possible to adjust the dotted chain line to the position where the oversteering control is restricted.

Figure 5:
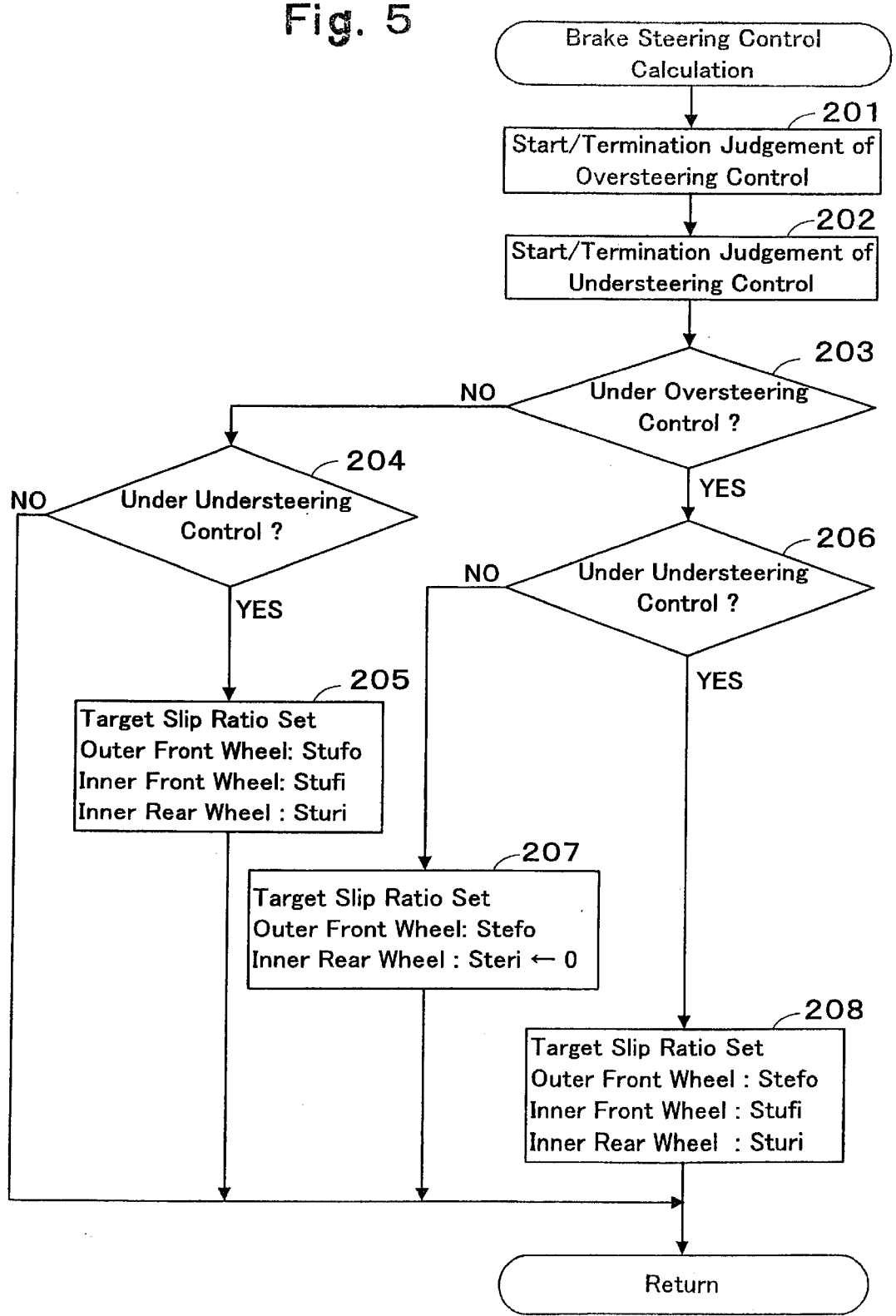
FIG. 5 is a flow chart showing the details of the brake steering control calculation carried out in step 110 of FIG. 4.
Figure 8:
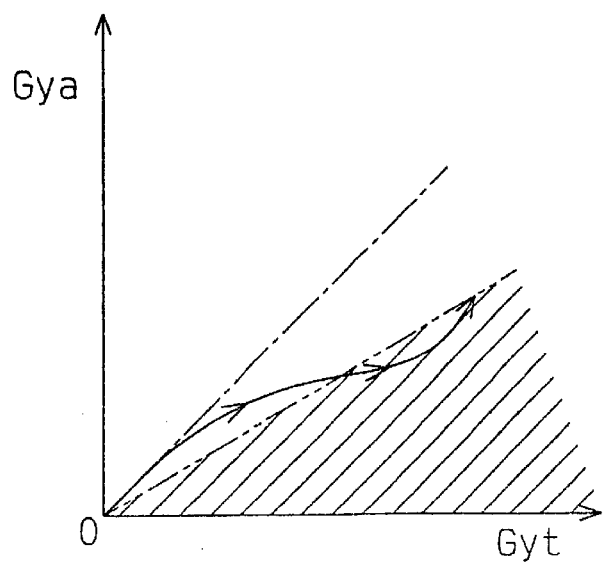
FIG. 8 is a graph showing a controlled area of understeering control according to the present invention.

In step 202 of FIG. 5, the start and termination judgment of the understeering control is judged by the condition of whether the steering control is in the controlled area indicated with cross-hatching in FIG. 8. The understeering control starts when the steering control is off of the orbit of an ideal condition shown by the one dotted chain line and enters into the controlled area in accordance with the change of the actual lateral acceleration Gya relative to the target lateral acceleration Gyt during the judgment. The understeering control is terminated when the steering control is out of the controlled area. The control is represented by way of example as the arrowed curve in FIG. 8. As in the case of the controller operating during the oversteering control as described above, when the actual vacuum pressure vr is rather small, it is possible to adjust the dotted chain line to the position where the understeering control is restricted.

Next, in step 203 of FIG. 5, it is judged whether or not the oversteering control is under operation. If the oversteering control is not under operation, it is judged whether or not the understeering control is under operation in step 204. If the understeering control is not under operation, the process returns to the beginning of the main routine. In step 204, if it is judged that the understeering is under operation (understeering control is being performed), the process proceeds to step 205, and the turning of the inner rear wheel and both of the front wheels are selected, with the target slip ratio of these wheels being set as Sturi, Stufo, and Stufi respectively at understeering control. In these designations, "S" stands for a slip ratio, "t" stands for a target which is compared with "a" mentioned later representing the actual measure, "u" stands for understeering control, "f" stands for a front wheel, "r" stands for a rear wheel, "o" stands for outer, and "i" stands for inner.

To set up the target slip ratio, the vehicle side slip angle β and the side slip angular velocity Dβ are used. When the target slip ratio under the understeering control is set up, a differential value between the target lateral acceleration Gyt and actual lateral acceleration Gya is used. The target lateral acceleration Gyt is determined based on the equation of Gyt=γ(θf)·Vso. The term γ(θf) is determined from the equation γ(θf)={(θf/N)·L}·Vso/(1+Kh·Vso2); where Kh stands for a stability factor, N stands for a steering gear ratio, and L stands for a wheel base.

In step 203, if it is judged that the oversteering control is under operation, the program proceeds to step 206 and it is judged whether or not the understeering control is under operation. If the understeering control is not under operation, the process proceeds to step 207. In step 207, a turning outer front wheel and a turning inner rear wheel are selected. The target slip ratios for these wheels are set as Stefo and Steri (=0) respectively, wherein "e" stands for the oversteering control.

If it is judged in step 206 that the understeering control is under operation or is being performed, the process proceeds to step 208. In step 208, the target slip ratio of the turning outer front wheel is set as Stefo for oversteering control. The target slip ratio of the turning inner front and rear wheels is set as Stufi and Sturi for understeering control. When the oversteering control and understeering control are performed simultaneously, the target slip ratio of the turning outer front wheel is set in the manner with the target slip ratio of the oversteering control. The target slip ratio of the turning inner front and rear wheels is set in the same manner with that of the understeering control.

In any case, the turning outer rear wheel (that is the driven wheel of a front wheel drive vehicle) is not controlled to calculate the vehicle speed Vso at the center of gravity position. The target slip ratio is not set for the turning outer rear wheel.

To determine the target slip ratio under the condition of the oversteering control, the vehicle side slip angle β and the side slip angular velocity Dβ are utilized. The following equations are set based on those values: Stefo=K1·β+ K2·Dβ; where K1 and K2 are constants. The target slip ratio Steri of the turning inner rear wheel is set at zero (0). The target slip ratio Stefo of the turning outer front wheel is set at the value for the control in the pressurizing direction (i.e., the direction to increase the braking force). On the other hand, to determine the target slip ratio under the condition of the understeering control, a deviation ΔGy between the target lateral acceleration Gyt and the actual lateral acceleration Gya is utilized. The target slip ratio Stufo of the turning outer front wheel is set at K3·ΔGy; where K3 is set at the value for the control in the pressurizing direction or in the depressurising direction. The target slip ratio Sturi of the turning inner rear wheel is set at K4·ΔGy; where K4 is set at the value for the control in the pressurizing direction.

Figure 6:
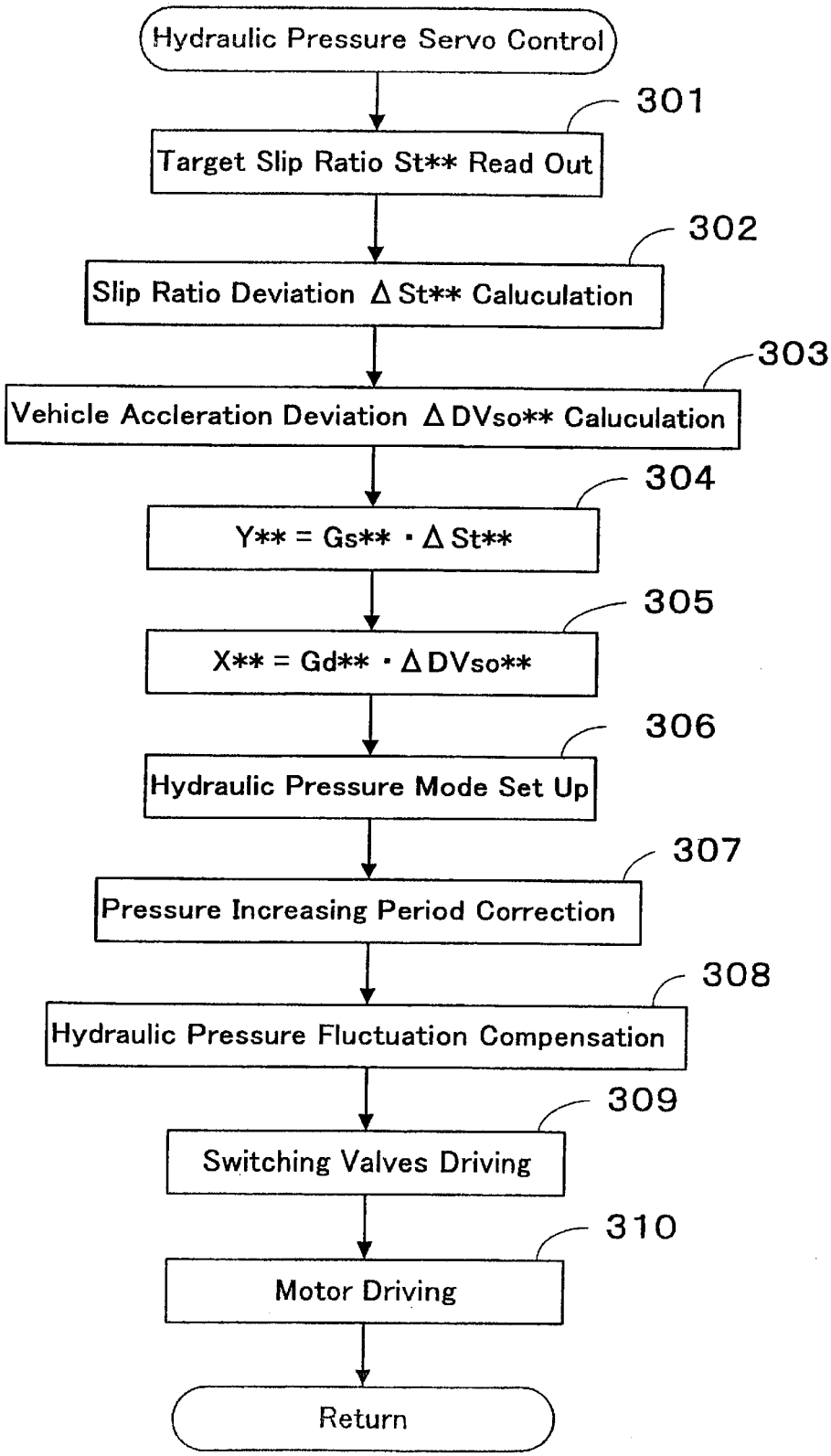
FIG. 6 is a flow chart showing the details of the hydraulic pressure control carried out in step 119 of FIG. 4.

The operational details associated with the hydraulic pressure servo control in step 119 of FIG. 4 will be explained with reference to FIG. 6. A slip ratio servo control of the wheel brake cylinder for each controlled wheel is performed. In step 301, the target slip ratio(s) (St) of the wheels where brake steering control should be performed as determined in steps 205, 207 and 208 in FIG. 5 is read out. The target slip ratio St is determined as the target slip ratio St** at each wheel.

In step 302, a slip ratio deviation ΔSt of each controlled wheel is calculated. In step 303, the vehicle acceleration deviation ΔDVso is calculated. In step 302, the difference between the target slip ratio St of the controlled wheel and the actual slip ratio Sa is calculated according to the equation: ΔSt=St−Sa. In step 303, the difference between the estimated vehicle acceleration (at the center of gravity position vehicle speed) DVso and the wheel acceleration DVw of each wheel is calculated. The calculation of the vehicle acceleration deviation ΔDVso and the actual slip ratio Sa vary depending on whether the controlling mode is the traction control or the anti-skid control. As this is known to individuals skilled in the art, a detailed explanation for these variations is not described here.

In step 304, one parameter Y for hydraulic brake pressure control at each controlling mode is calculated as Gs·ΔSt; where Gs is a gain and is determined in accordance with the vehicle side slip angle β. In step 305, another parameter X for hydraulic brake pressure control is calculated as Gd·ΔDVso; where Gd is a constant. In step 306, for each controlled wheel, the hydraulic pressure mode based on the aforementioned parameters X and Y** is set following the control map shown in FIG. 9.

Figure 9:
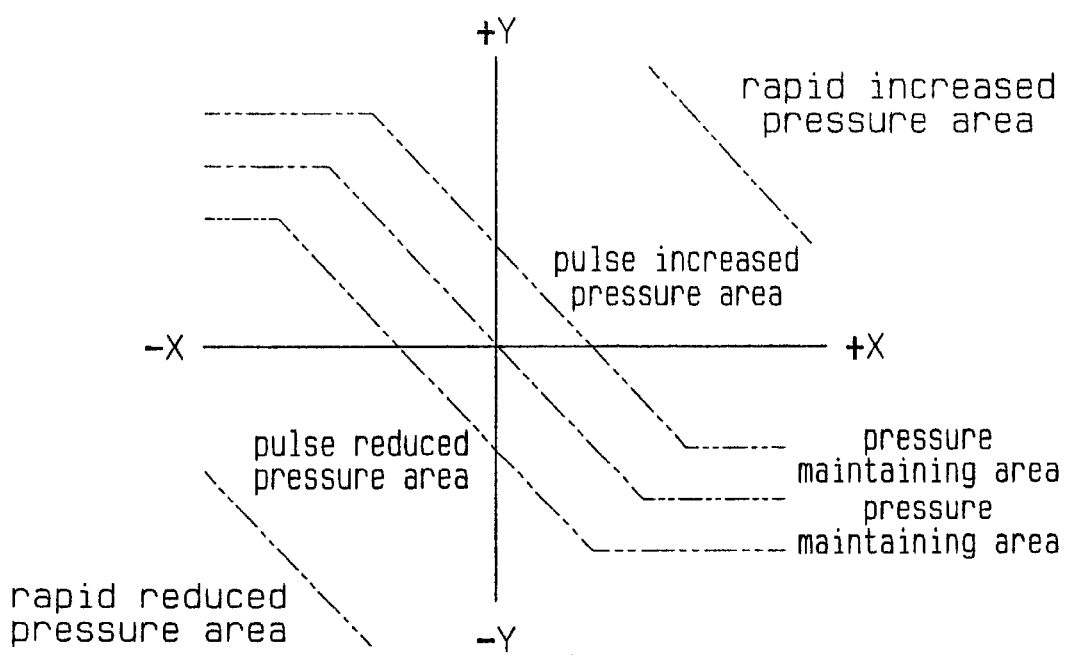
FIG. 9 is a graph showing the relationship of a parameter for hydraulic brake pressure control and hydraulic pressure mode (for a hydraulic brake pressure control) according to the present invention.

In FIG. 9, a rapid reduced pressure area (or mode), a pulse reduced pressure area (or mode), a hydraulic pressure maintaining area (or mode), a pulse increased pressure area (or mode), and a rapid increased pressure area (or mode) are set in advance. In step 306, in accordance with values of the parameters X and Y, the corresponding area is determined. The hydraulic pressure control mode is not set at the non controlling condition (solenoids are turned off).

Figure 12:
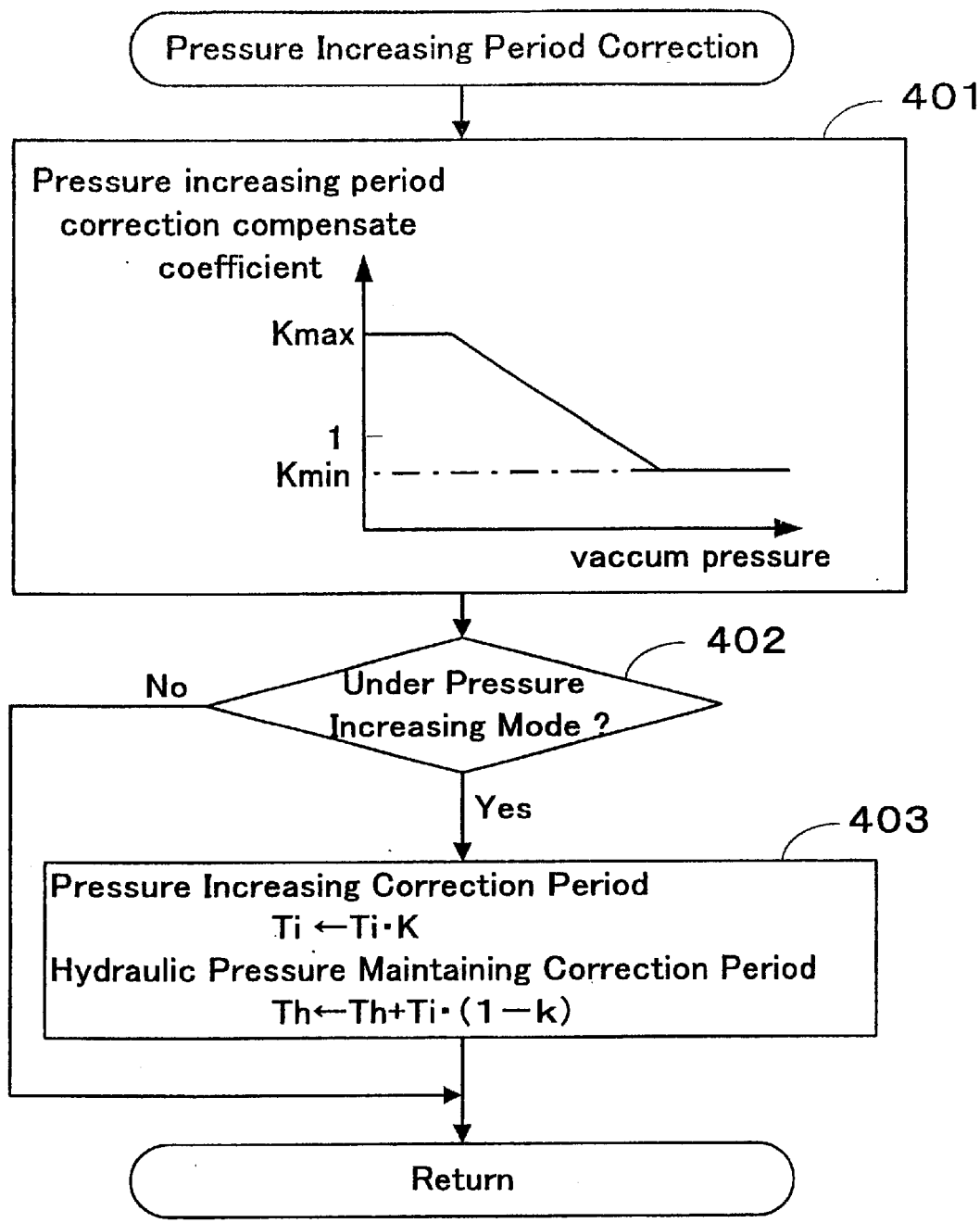
FIG. 12 is a flow chart showing the details of the pressure increasing period correction carried out in step 307 of FIG. 6.

In step 307, a pressure increasing period correction, which is shown in FIG. 12, is performed. If the mode is switched (e.g., from reducing to increasing or vice versa) in step 306, a hydraulic pressure fluctuation compensation process is performed in step 308 to prevent a steep hydraulic brake pressure from changing. For instance, when the mode is changed form a rapid reduced pressure area mode to a pulse increased pressure mode, a rapid increasing hydraulic brake pressure control is performed and the controlling time is determined in accordance with a duration of the rapid reduced pressure mode.

In step 309, the solenoid switching valves PC1–PC8 are controlled in accordance with the hydraulic pressure control mode (in step 306), the pressure increasing period correction (in step 307) and the pressure fluctuation compensation process (step 308), and a braking force is applied to each wheel. In step 310, the motor driving process is performed. In the above mentioned embodiment, the braking force is controlled in accordance with the slip ratio to calculate the controlling target. However, another parameter corresponding to the braking force applied to each wheel cylinder (e.g., a hydraulic braking force in each wheel cylinder) can also be used to calculate the target parameter of oversteering or understeering control.

Figure 11:
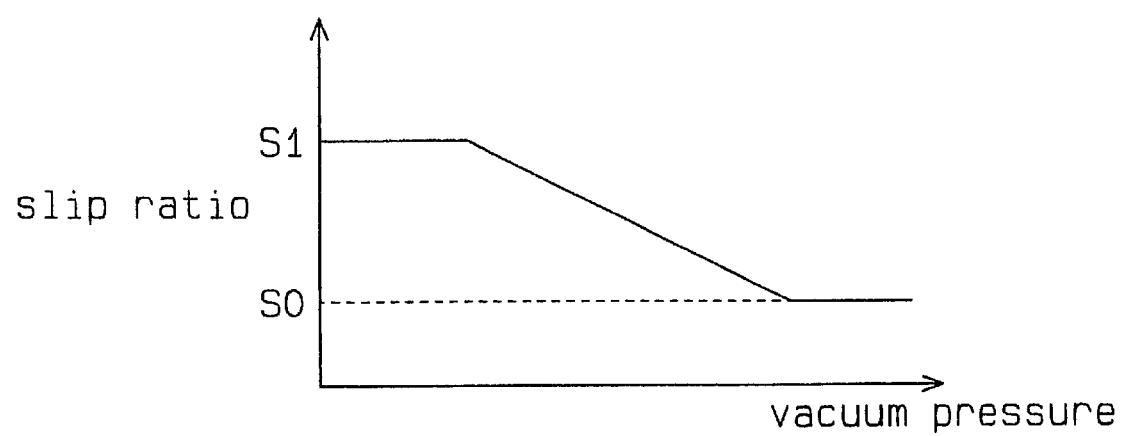
FIG. 11 is a graph showing the relationship between the vacuum pressure and the side slip ratio.

The above-described embodiment, which is shown FIGS. 5–10, is based on brake steering control, although in traction control a slip rate is applied to determine the start judgment. Therefore, FIG. 11 shows one example of a start judgment under traction control. Under the condition that the vacuum pressure Vr in the constant pressure chamber B2 is a normal condition (sufficient vacuum pressure), the start judgment for traction control is set at SO. In accordance with a decreasing vacuum pressure Vr in the constant pressure chamber B2, the slip rate increases (e.g., the slip ratio S1 shown in FIG. 11). The more the decrease in the vacuum pressure Vr, the more the start judgment is adjusted to the position where the traction control is restricted.

FIG. 12 shows the process associated with the pressure increasing period correction in step 307. A pressure increasing period correction compensation coefficient K is set in accordance with the vacuum pressure Vr from the vacuum pressure sensor VS using the map shown in step 401 of FIG. 12. In step 401, Kmax, which is greater than 1, shows a maximum of the pressure increasing period correction compensation coefficient K, while Kmin, which is less than 1, shows a minimum of the pressure increasing period correction compensation coefficient K. In step 402, if it is judged that the present condition is under the pressure increasing mode (a pulse increased pressure area or a rapid increased pressure area are decided from FIG. 9), the program proceeds to step 403. In step 403, a pressure increasing correction period Ti is calculated in accordance with the equation: Ti=Ti·K. At the same time, the period of hydraulic pressure maintaining correction period Th is calculated in accordance with the equation Th=Th+Ti·(1−K). If it is judged that the present condition is not the pressure increasing mode, the program returns to the FIG. 6 sub-routine.

Therefore, when the vacuum pressure Vr in the constant pressure chamber B2 is decreased, the pressure increasing correction period Ti is set to a longer period by the equation Ti=Ti·K and the hydraulic pressure maintaining correction period Th is set to a shorter period by the equation Th=Th+Ti·(1−K). As a result, the change of slope with braking force, which is caused by decreasing vacuum pressure Vr in the constant pressure chamber B2, can be appropriately adjusted.

In this embodiment, the vacuum pressure sensor VS is used in the constant pressure chamber B2. As an alternative, it is also possible to employ a sensor (illustrated in dotted outline form as VS in FIG. 1) which detects the engine EG intake vacuum pressure. Also, to accomplish the vehicle motion control, the engine EG intake vacuum pressure could be estimated by using the signal from the throttle sensor THS and an engine rotational speed from an engine rotational speed sensor (illustrated in dotted outline form as ERS in FIG. 1).

By virtue of the present invention, because the brake control means controls the starting of the vehicle motion control in the direction that the vehicle motion control is restricted when the vacuum pressure which drives the vacuum booster being relatively small, the vehicle motion is appropriately controlled. Also, when the vacuum pressure in the constant pressure chamber is decreased, the pressure increasing correction period is set for a longer period and the change of slope with braking force can be appropriately adjusted. When the vacuum pressure is detected directly by the vacuum pressure sensor, the starting of vehicle motion control or the duration of the hydraulic brake pressure increase are adjusted promptly and adequately. In addition, if the vacuum pressure detecting means is applied to the system, the detection means is able to estimate the vacuum pressure in the vacuum booster and the system works without a vacuum sensor to adjust the starting of vehicle motion control or the duration of the hydraulic brake pressure increase. The use of a pressure detecting means can help reduce the system cost.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle motion control system comprising:
    a wheel brake cylinder for applying a braking force to a wheel;
    an automatic hydraulic pressure generator which generates hydraulic braking pressure by driving a vacuum booster irrespective of brake pedal operation;
    a hydraulic pressure control valve disposed between the automatic hydraulic pressure generator and the wheel brake cylinder to adjust hydraulic brake pressure supplied to the wheel brake cylinder;
    brake control means for performing vehicle motion control by controlling the automatic hydraulic pressure generator and the hydraulic pressure control valve in accordance with a vehicle motion condition irrespective of brake pedal operation;
    vacuum pressure detecting means for detecting a vacuum pressure of the vacuum booster; and
    the brake control means controlling starting of vehicle motion control to restrict starting of vehicle motion control when the vacuum pressure which drives said vacuum booster is relatively smaller compared to when the vacuum pressure which drives said vacuum booster is relatively larger.

2. The vehicle motion control system according to claim 1, wherein the vacuum pressure detecting means is a vacuum sensor for detecting vacuum pressure in the vacuum booster and the brake control means controls the starting of vehicle motion control in response to at least the vacuum pressure detected by the vacuum sensor.

3. The vehicle motion control system according to claim 1, wherein a vacuum source of the vacuum booster is an engine intake manifold.

4. The vehicle motion control system according to claim 3, wherein the vacuum pressure detecting means detects intake vacuum pressure in the engine intake manifold and the brake control means controls the starting of vehicle motion control in response to at least the engine intake vacuum pressure.

5. The vehicle motion control system according to claim 4, wherein the vacuum pressure detecting means is a vacuum sensor which detects the vacuum pressure in the engine intake manifold.

6. The vehicle motion control system according to claim 4, wherein the vacuum pressure detecting means calculates a vacuum pressure in the engine intake manifold using a throttle sensor and an engine rotation sensor.

7. The vehicle motion control system according to claim 1, wherein the automatic hydraulic pressure control generator includes a master cylinder which is controlled in response to the brake pedal operation through the vacuum booster;
    the vacuum booster includes a valve mechanism arranged on a movable partition for controlling a pressure difference between a constant chamber and a variable chamber in response to the brake pedal operation; and
    a booster driving device which generates a hydraulic braking pressure by driving the valve mechanism of the vacuum booster irrespective of brake pedal operation.

8. The vehicle motion control system according to claim 7, wherein the booster driving device includes a solenoid, a fixed core and a movable core which is operated when the solenoid is energized.

9. The vehicle motion control system according to claim 7, wherein the vacuum booster includes a first input rod which is connected to the brake pedal and a second input rod which is operatively connected to the valve mechanism.

10. The vehicle motion control system according to claim 9, wherein the first input rod and second input rod are relatively movable.

11. A vehicle motion control system comprising:
    a wheel brake cylinder for applying braking force to a wheel;
    an automatic hydraulic pressure generator which generates a hydraulic braking pressure by driving a vacuum booster irrespective of brake pedal operation;
    a hydraulic pressure control valve disposed between the automatic hydraulic pressure generator and the wheel brake cylinder to adjust hydraulic brake pressure supplied to the wheel brake cylinder;
    brake control means for performing vehicle motion control by controlling the automatic hydraulic pressure generator and the hydraulic pressure control valve in accordance with a vehicle motion condition irrespective of brake pedal operation;
    a vacuum pressure detecting means for detecting a vacuum pressure of the vacuum booster; and
    the brake control means controlling a duration of a hydraulic brake pressure increase in the wheel cylinder by the hydraulic pressure control valve to be longer when the vacuum pressure which drives said vacuum booster is relatively smaller as compared to when the vacuum pressure which drives said vacuum booster is relatively larger.

12. The vehicle motion control system according to claim 11, wherein the vacuum pressure detecting means is a vacuum sensor for detecting vacuum pressure in the vacuum booster and the brake control means controls the duration of the hydraulic brake pressure increase in response to at least the vacuum pressure.

13. The vehicle motion control system according to claim 11, wherein a vacuum source of the vacuum booster is an engine intake manifold.

14. The vehicle motion control system according to claim 13, wherein the vacuum pressure detecting means detects intake vacuum pressure in the engine intake manifold and the brake control means controls the duration of the hydraulic brake pressure increase in response to at least the engine intake vacuum pressure.

15. The vehicle motion control system according to claim 14, wherein the vacuum pressure detecting means is a vacuum sensor for detecting a vacuum pressure in the engine intake manifold.

16. The vehicle motion control system according to claim 14, wherein the vacuum pressure detecting means calculates a vacuum pressure in the engine intake manifold using a throttle sensor and an engine rotation sensor.

17. The vehicle motion control system according to claim 11, wherein the automatic hydraulic pressure control generator includes a master cylinder which is controlled in response to the brake pedal through the vacuum booster;

the vacuum booster includes a valve mechanism arranged on a movable partition for controlling a pressure difference between a constant chamber and a variable chamber in response to the brake pedal operation; and a booster driving device which generates a hydraulic braking pressure by driving the valve mechanism of the vacuum booster irrespective of brake pedal operation.

18. The vehicle motion control system according to claim 17, wherein the booster driving device includes a solenoid, a fixed core and a movable core which is operated when the solenoid is energized.

19. The vehicle motion control system according to claim 17, wherein the vacuum booster includes a first input rod which is connected to the brake pedal and a second input rod which is operatively connected to the valve mechanism.

20. A vehicle motion control system comprising:

a wheel brake cylinder for applying a braking force to a wheel;

an automatic hydraulic pressure generator which generates hydraulic braking pressure by driving a vacuum booster irrespective of brake pedal operation;

a hydraulic pressure control valve disposed between the automatic hydraulic pressure generator and the wheel brake cylinder to adjust hydraulic brake pressure supplied to the wheel brake cylinder;

brake control means for performing vehicle motion control by controlling the automatic hydraulic pressure generator and the hydraulic pressure control valve in accordance with a vehicle motion condition irrespective of brake pedal operation;

vacuum pressure detecting means for detecting a vacuum pressure of the vacuum booster; and the brake control means controlling starting of vehicle motion control so that the starting of vehicle motion control is more restricted when the vacuum pressure which drives said vacuum booster is relatively lower and is less restricted when the vacuum pressure which drives said vacuum booster is relatively higher.

* * * * *